Figure 1:
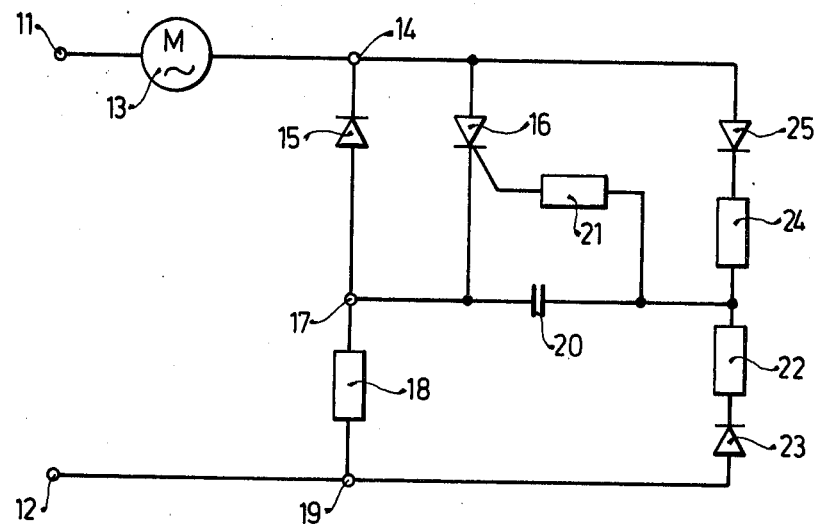

United States Patent [19]

Werner et al.

[11] 4,157,491

[45] Jun. 5, 1979

[54] SPEED CONTROL SYSTEM FOR A UNIVERSAL A-C, D-C MOTOR CONNECTED TO AN A-C NETWORK

[75] Inventors: Peter Werner, Stuttgart; Klaus Harsch, Ditzingen, both of Fed. Rep. of Germany

[73] Assignee: Robert Bosch GmbH, Stuttgart, Fed. Rep. of Germany

[21] Appl. No.: 848,114

[22] Filed: Nov. 3, 1977

[30] Foreign Application Priority Data

Dec. 2, 1976 [DE] Fed. Rep. of Germany ....... 2654534

[51] Int. Cl.² .............................................. H02P 5/28
[52] U.S. Cl. ................................... 318/798; 318/812; 318/245; 318/332; 318/345 C
[58] Field of Search ............... 318/227, 230, 245, 332, 318/345 C, 798, 812

[56] References Cited

U.S. PATENT DOCUMENTS

| | | | |
|---|---|---|---|
| 3,292,069 | 12/1966 | Evans, Jr. | 318/245 X |
| 3,324,372 | 6/1967 | Myers | 318/227 |
| 3,399,333 | 8/1968 | Canter | 318/227 |
| 3,551,768 | 12/1970 | Lagier | 318/245 |
| 4,002,959 | 1/1977 | Schadlich et al. | 318/245 |

*Primary Examiner*—Gene Z. Rubinson
*Attorney, Agent, or Firm*—Flynn & Frishauf

[57] ABSTRACT

The motor is serially connected with a diode and a sensing resistor so that half waves of one polarity, for example negative, can flow through the motor and provide, across the resistor, a voltage drop corresponding to loading placed on the motor. A thyristor is connected in parallel to the diode and reversely poled to conduct the other half wave, then the positive, if triggered. Triggering of the thyristor is controlled by the voltage drop across the sensing resistor so that, under no-load conditions, only the negative half waves will be applied to the motor, thus limiting its no-load speed but, as loading is placed thereon, increasing portions of the positive half waves are likewise passed through the motor. The diode may, itself, be a controlled diode such as a thyristor which is rendered conductive by a phase control network, thus providing speed control for the motor, controlling actually only the negative half wave but, due to sensing resistor, effectively, regulating the motor current during both half waves. The circuit uses a capacitor which is charged to the voltage forming the control voltage on the thyristor conducting the positive half wave.

11 Claims, 2 Drawing Figures

SPEED CONTROL SYSTEM FOR A UNIVERSAL A-C, D-C MOTOR CONNECTED TO AN A-C NETWORK

Reference to related prior art German Disclosure Document DT-OS 23 24 174.

The present invention relates to a speed control circuit and system for a universal a-c, d-c motor connected to an a-c network, and more particularly to a speed control system in which the no-load speed is limited. A typical application of the circuit and system of motor control is for fractional horse power motors, such as hand-held drills, and other types of appliance motors.

BACKGROUND AND PRIOR ART

It has previously been proposed to control the speed of a universal motor by phase control, in that the motor is serially connected to one or more thyristors which are triggered or fired in timed relation to undulations of an a-c supply network so that the relative proportion of the phase of the half waves being applied to the motor can be controlled. Reference is made to German Disclosure Document DT-OS 23 24 174 which discloses a speed control system for an electric drill in which a control network is used including a thyristor. This system is comparatively complex and requires a substantial number of circuit components; additionally, it provides current supply to the motor only during a half wave of the supplied alternating current so that the full power rating of the motor cannot be utilized.

THE INVENTION

It is an object to provide a control system which uses only few components while still applying both half waves of applied alternating current energy to a universal motor so that maximum power and best efficiency can be obtained from the motor with high operating reliability and low initial costs while, additionally, providing for effective high-speed operating limitations under no-load conditions so that overloading of the bearings of the motor or any attached appliance or gearing is effectively avoided if a load on the motor is removed. As an ancillary object, the system should be capable of being used with a speed control arrangement so that the operating speed of the motor will remain essentially constant upon loading thereof.

Briefly, a diode is serially connected with the motor to conduct one half wave of applied alternating current through the motor windings at all times. A sensing resistor is serially connected with the motor-diode circuit to provide a voltage drop thereacross which is representative of loading on the motor. A thyristor, of reverse polarity to that of the diode, is connected in parallel to the diode. Firing of the thyristor is controlled as a function of motor current flowing during the half wave when the diode is conductive, as sensed by the sensing resistor.

In accordance with a feature of the invention, the normally conductive diode can be replaced by a thyristor, the firing angle of which is controlled to provide a speed control circuit.

In accordance with a further feature of the invention, the voltage across the sensing resistor is used to charge a capacitor which is additionally charged through a resistor-diode network from the power supply to the motor during the half wave when the diode blocks. The voltage supplied by the sensing resistor is combined with the charge voltage on the capacitor which, in turn, is connected to the gate of the thyristor, thus controlling firing of the thyristor in accordance with loading placed on the motor as sensed by current flow through the diode when it is conductive, and hence voltage drop across the sensing resistor during that half cycle of applied power.

DRAWINGS, Illustrating an Example

Figure 2:
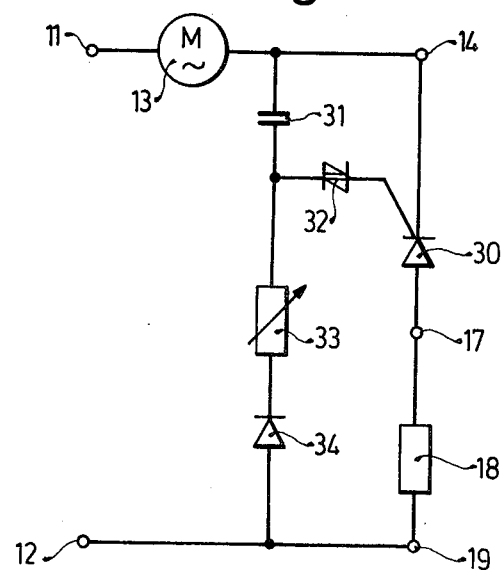

FIG. 1 is a general schematic diagram of the speed control system in accordance with the present invention; and FIG. 2 is a fragmentary diagram of the system of FIG. 1, illustrating a modification.

An alternating voltage, for example of 220 V, is connected across terminals 11, 12, and forming a source of electrical power supply. Terminal 11 is connected to a universal or series motor 13, the other terminal of which is connected to a junction 14. Junction 14 is connected to a parallel network of a diode 15 and a thyristor 16, in which the diode 15 and thyristor 16 are connected to conduct, respectively, half waves of opposite polarity. The parallel circuit 15–16 is connected to a common junction 17 which is connected through a sensing resistor 18 to a terminal 19 which forms a common connection for further connection to the return terminal 12 of the power source. The second junction 17 is connected to one electrode of a capacitor 20, the other electrode of which is connected through a coupling resistor 21 to the gate of thyristor 16. The other electrode of capacitor 20 and the coupling resistor 21 are further connected to a junction point between a diode—resistor network formed by diodes 23, 25 and resistors 22, 24, so connected that the series connection of diode 25 and resistor 24 are connected to the junction 14, the series connection of diode 23 and resistor 22 to the junction 19, and the common connection between the two resistors 22, 24 to the other terminal of the capacitor 20 and also to the coupling resistor 21 leading to the gate of thyristor 16.

OPERATION

Let it be assumed that, at any instant of time, the power supply connected to terminals 11, 12 provides a negative half wave. Current will then flow through the motor and diode 15 and over resistor 18 to terminal 12. The voltage drop across resistor 18 is supplied to the capacitor 20 through diode 23 and resistor 22. Upon the next half wave, which will then be a positive half wave, the capacitor 20 will already be charged to a certain voltage level determined by the current which flowed through the motor 13 during the previous negative half wave, and dropped across the resistor 18. At the next positive half wave, initially, no motor current will flow since diode 15 is blocked and the thyristor 16 likewise is blocked, that is, has not fired. The capacitor 20 will, however, further be charged over resistor 24 and diode 25. When the voltage across capacitor 20 has reached a value which is sufficient to fire the thyristor 16, it will become conductive; in other words, the discharge current of capacitor 20 through resistor 21 to the gate of the thyristor 16 must be sufficient to cause thyristor 16 to fire.

Under no-load condition, the current through motor 13 will be low. Thus, the capacitor 20 will be charged during the negative half wave only to a slight extent. Subsequent charge of the capacitor supplied over the diode 25 and the resistor 24 during the positive half wave will be insufficient to reach a potential across the capacitor 20 which causes firing of the thyristor 16, and the positive half wave will remain blocked. This limits the no-load speed of the motor 13 since it is supplied, effectively, only by current during half of the waves of the a-c supply.

Upon increased loading on the motor, motor current will increase and the voltage drop across resistor 18 will increase. This increases the charge across capacitor 20 which will reach firing voltage when it is additionally charged during the positive half wave over diode 25 and resistor 24. The charging time constant can be adjusted by suitable selection of resistors 22, 24 in such a manner that the capacitor 20 will be charged to such an extent when the motor is operating at full load that the thyristor 16 will fire practically immediately upon occurrence of the positive half wave. Upon loading of the motor 13, therefore, with full rated load, or even under overload conditions, motor 13 will have full supply voltage at both half waves applied thereto.

FIG. 2 illustrates a modification of the circuit of FIG. 1 and only that portion to the left of junctions 14, 19 is shown in greater detail, the remainder being identical to that of FIG. 1. The diode 15 is replaced by a controlled diode, namely by thyristor 30, the firing angle of which is controlled by a voltage divider network. The voltage divider network includes a diode 24, an adjustable resistor 33 and a capacitor 31, all serially connected. The junction between resistor 33 and capacitor 31 is connected through a voltage-sensitive or trigger diode 32, forming a controlled resistor, to the gate of thyristor 30. Diode 34 and thyristor 30 are similarly poled, that is, poled similarly to diode 15 (FIG. 1).

OPERATION

Circuit of FIG. 2

Let it be assumed again that the negative half wave of supply voltage is applied to terminals 11, 12. Thyristor 30 is initially blocked. Capacitor 31 is charged over diode 34 through the adjustable resistance 33. The adjustable resistance 33 controls the speed which the motor is to have. When the charge on the capacitor 31 reaches a value which is sufficiently high to cause the diode 32 to fire, thyristor 30 will be fired and current will flow through resistor 18 and thyristor 30 to, again, provide a control voltage across the resistor 18 which charges capacitor 20 (FIG. 1) controlling firing of thyristor 16. High-speed limitation is obtained similarly to the operation described in connection with FIG. 1. Speed control is obtained by suitably changing the resistance value of resistor 33.

In the circuit of FIG. 2, speed control is effected by controlling the negative half wave by adjustment of resistor 33; the positive half wave is then controlled correspondingly, that is, corresponding to current flow during the negative half wave, so that control of the negative half wave will have an additional controlling effect on the thyristor 16 firing during the positive half wave. Both the circuits of FIGS. 1 and 2 use both half waves to supply energy to the motor.

The system of FIG. 1 can be used without manual, adjustable speed control and limits no-load speed applied to the motor. Depending on use and purposes of the motor, the system of FIG. 1 or that of FIG. 2 can be used.

Although not strictly necessary, it is desirable to connect an R/C circuit across thyristor 30 to suppress voltage peaks.

In a typical example, for connection to a 220 V supply, the following values would be suitable: Current-carrying
capacity of diode 15: 2A;
resistor 18: 1 ohms; capacitor 20: 4.F$\mu$uF;
resistor 22: 200 ohms; resistor 24: 100 k ohms;
FIG. 2, capacitor 31: 0.7 $\mu$uF; max. resistance of resistor 33: 500 ohms.

Various changes and modifications may be made, and features described in connection with any one of the embodiments may be used with any of the others.

We claim:
1. Speed control system for connection to a source of alternating current to control a series motor comprising
a thyristor (16) serially connected into the main power path of the motor (13) and the source (11, 12) and passing half waves from the source of one polarity (positive) when triggered, while blocking current flow of half waves of the opposite polarity (negative);
diode means (15, 30) connected in parallel with said thyristor and poled oppositely with respect thereto to pass half waves of said other polarity (negative) while blocking half waves of said first polarity (positive);
motor power drawing sensing means (18) sensing current flow through the motor during the half wave when said diode means (15, 30) is conductive, and deriving a control voltage representative of said current flow;
a capacitor (20);
the capacitor being connected to said motor power drawing sensing means (18) and storing said control voltage thereon during the half wave when said diode means (15, 30) is conductive;
a charge circuit (24, 25) connected to the a-c source (11, 12) for the capacitor including a charging diode (25) therein poled oppositely to the diode means (15, 30) in the motor circuit and charging the capacitor when current flows through the motor through said diode means;
said capacitor (20) being connected to the gate electrode of the thyristor (16) to control firing thereof as a function of the charge on the capacitor;
firing of the thyristor being thus controlled as a function of the current through the motor and hence of said control voltage during the half wave of opposite polarity (negative) and further during occurrence of the half wave of said one polarity (positive), firing occuring earlier in the next half wave of said one polarity when the current drawn by the motor during said half wave of opposite polarity (negative) rises as an indication of loading on the motor, and hence to provide more power to the motor during at least a portion of said half wave of said one polarity (positive),
the motor power drawing sensing means (18) being dimensioned to provide a control voltage to the capacitor (20) insufficient to trigger said thyristor under essentially no-load conditions, so that the thyristor will block application of power to the motor during the half wave of said one polarity (positive) if the power drawing sensing means provides a control voltage indicative of practically no-load operation of the motor.
2. System according to claim 1, wherein the motor power drawing sensing means comprises a resistor (18) serially connected in circuit with the motor (13).

3. System according to claim 1, wherein (FIG. 2) the diode means comprises a controlled diode (30);
a voltage divider (31, 33, 34) is provided, and means (32) connecting a control voltage to said controlled diode to control current flow therethrough as a function of voltage at a tap point of the voltage divider.

4. System according to claim 3, wherein the voltage divider includes a controlled resistor (33) to vary the voltage at said tap point of the voltage divider; and the controlled diode (30) comprises a thyristor 5. System according to claim 4, wherein the connection means from the tap point of the voltage divider to the thyristor (30) forming the diode means includes a voltage sensitive trigger diode (32).

6. System according to claim 4, wherein the motor power drawing sensing means comprises a resistor (18) serially connected in circuit with the motor (13).

7. System according to claim 1, further including a coupling resistor (21) connecting the capacitor (20) to the gate electrode of the thyristor (16).

8. Speed control system for connection to a source of alternating current to control a series motor comprising
a thyristor (16) serially connected into the main power path of the motor (13) and the source (11, 12) and passing half waves from the source of one polarity (positive) when triggered, while blocking current flow of half waves of the opposite polarity (negative);
diode means (15, 30) connected in parallel with said thyristor and poled oppositely with respect thereto to pass half waves of said other polarity (negative) while blocking half waves of said first polarity (positive);
a resistor (18) serially connected with the motor and the parallel network of said diode means (15, 30) and the thyristor (16) and providing a control voltage representative of current flow through the motor;
a control signal generating means including a capacitor (20) connected to the gate electrode of the thyristor and to the resistor (18) to control firing of the thyristor as a function of the voltage on the capacitor;
the capacitor (20) having a voltage occurring between the diode means (15, 30) and hence the thyristor (16) and said sensing resistor (18), as a result of motor current flow through the diode means during said half wave of reverse polarity applied to a plate thereof to charge the capacitor during said half wave of reverse polarity to a value representative of current flow through the motor during said half wave of reverse polarity, said control signal generating means further including a charge network to additionally charge the capacitor from said source during half waves of said one polarity (positive).

9. System according to claim 8, wherein the charge network of the control signal generating means comprises a resistance diode network (22, 23; 24, 25) having two diodes, poled and connected to alternately charge the capacitor during alternate half waves of said one polarity (positive) to determine the control signal applied to the gate of the thyristor (16) as a composite of the charge voltage on the capacitor (20) during said half cycle of reverse polarity (negative) as determined by motor loading, and the charge voltage applied thereby during said half wave of said one polarity (positive).

10. System according to claim 8, wherein (FIG. 2) the diode means comprises a thyristor (30);
and a controlled voltage divider (31, 33, 34) is provided, and having a tap point of controllable voltage connected (32) to the gate of the thyristor (30) forming said diode means to control firing of said thyristor and hence current flow through the motor and said sensing resistor (18) during said half waves of reverse polarity (negative) and hence adjustably control the control voltage applied to the capacitor as a function of the setting or adjustment of the voltage divider, to control current flow through the motor during all alternate half cycles of the a-c power supply, by directly controlling the firing angle of the thyristor (30) forming the diode means and controlling the firing angle of the thyristor (16) which is poled opposite to that of said thyristor (30) forming the diode means by controlling the charge on the capacitor (20) as a function of the control voltage across the sensing resistor (18) due to current flow when the thyristor (30) forming the diode means is conductive.

11. System according to claim 10, wherein the charge network of the signal generating means comprises a resistance diode network (22, 23; 24, 25) having two diodes, poled and connected to alternately charge the capacitor during alternate half waves of said one polarity (positive) to determine the control signal applied to the gate of the thyristor (16) as a composite of the charge voltage on the capacitor (20) during said half cycle of reverse polarity (negative) as determined by motor loading, and the charge voltage applied thereby during said half wave of said one polarity (positive).

* * * * *